INVENTOR.
EDWARD J. ABENDSCHEIN
ATTORNEY

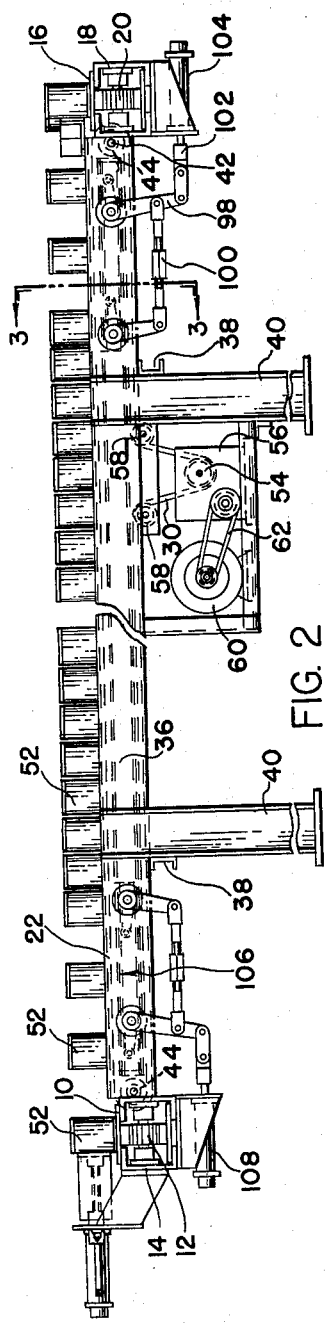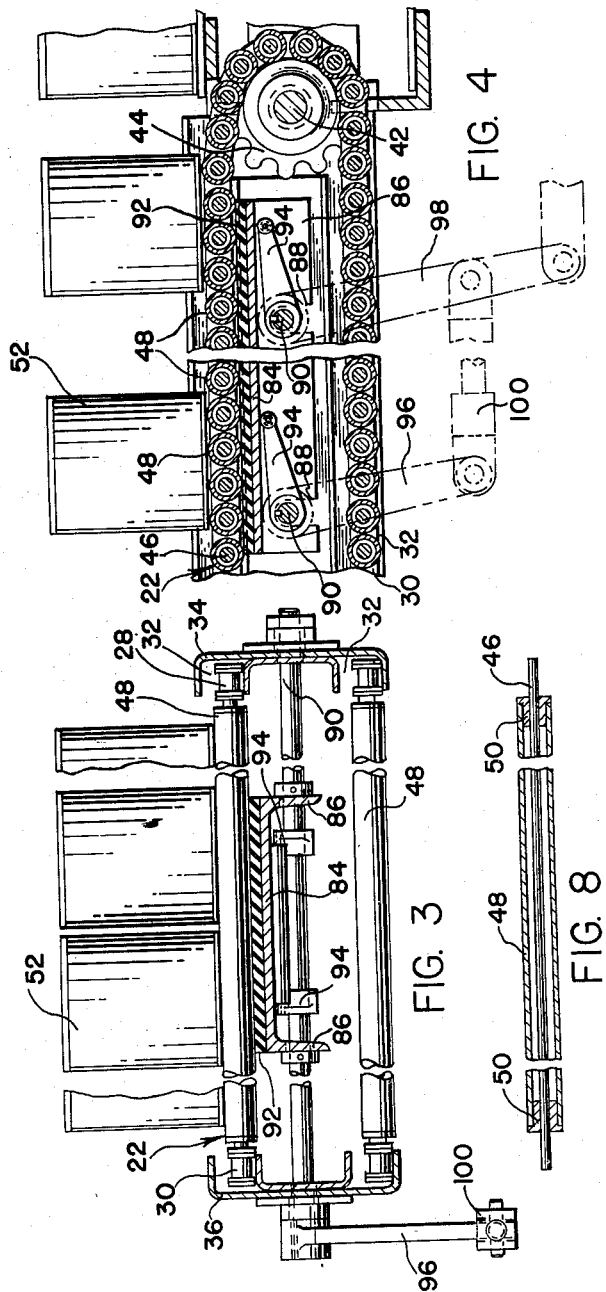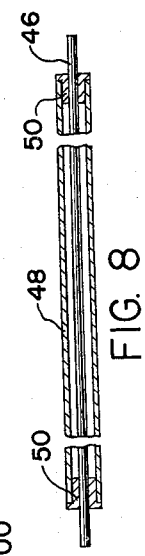

Sept. 20, 1960 E. J. ABENDSCHEIN 2,953,234
CONVEYING AND ARRANGING SYSTEM FOR CONTAINERS
Filed Sept. 9, 1957 3 Sheets-Sheet 3
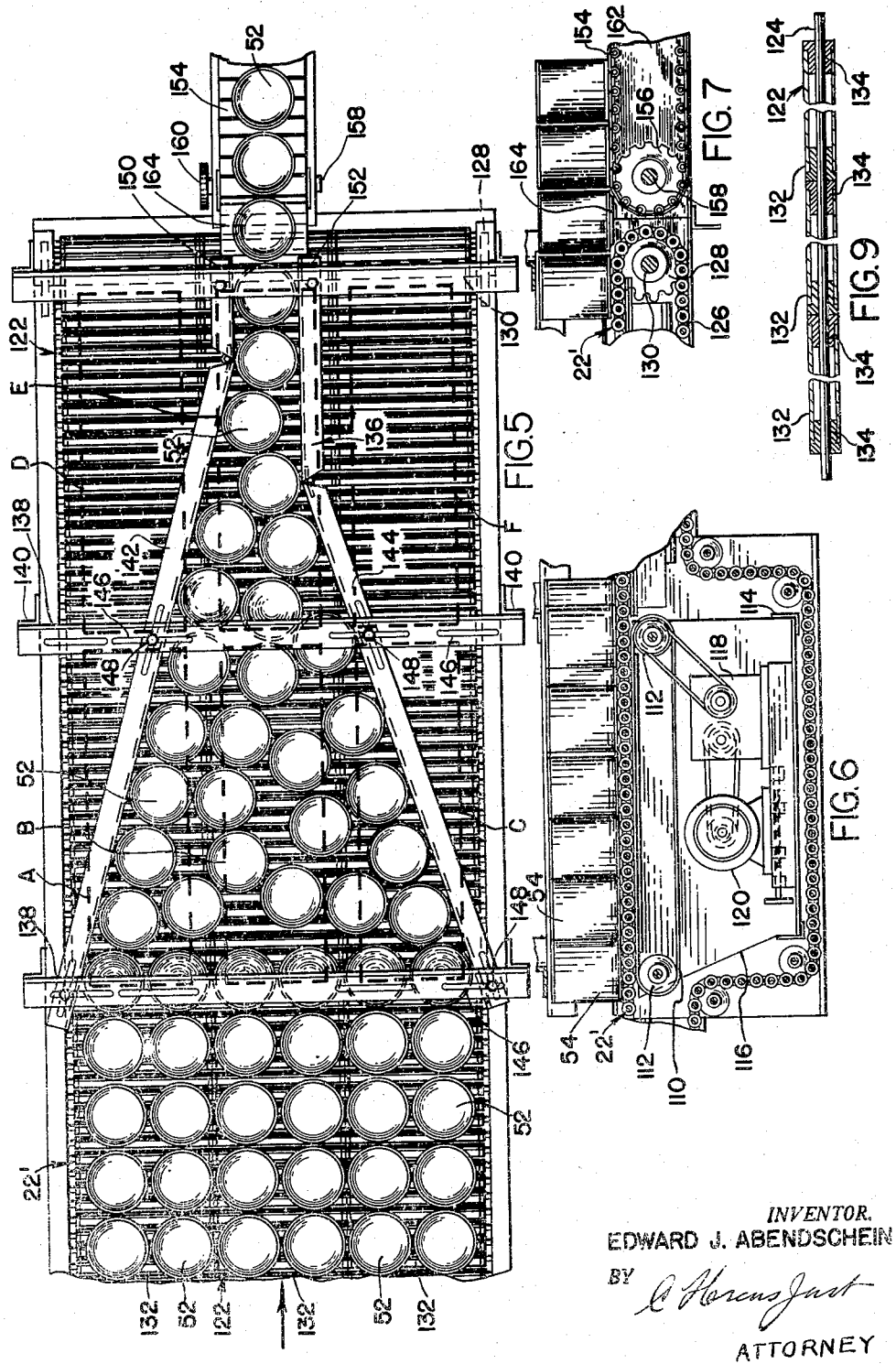
INVENTOR.
EDWARD J. ABENDSCHEIN
BY
ATTORNEY

United States Patent Office

2,953,234
Patented Sept. 20, 1960

2,953,234
CONVEYING AND ARRANGING SYSTEM FOR CONTAINERS

Edward J. Abendschein, Hanover, Pa., assignor to Chisholm-Ryder Company of Pennsylvania, Hanover, Pa., a corporation of Pennsylvania Filed Sept. 9, 1957, Ser. No. 682,744

17 Claims. (Cl. 198—30)

This invention relates to improvements in a conveying and arranging system for containers, and more particularly, to a system for receiving and storing a substantial number of containers, and then feeding said containers in successive rows from the receiving and storing means.

The present invention may be utilized to handle containers of a wide range of kinds, shapes and sizes, it being understood however that at any one time, the containers to be handled by the system should be of the same shape and dimensions. The system however is highly universal in that it is adaptable to handle cans, ranging for example, from 1 gallon size to half-pint size. Likewise, the system readily may handle glass or other kinds of ceramic containers of a wide range of sizes and shapes. Not only may the containers be sealed such as tin cans with the covers or caps sealed in place, as well as glass jars and the like having caps or covers applied thereto, but the system also may handle other containers either sealed or not, such as flasks, beakers, or other types of containers which are capable of standing in an upright position when disposed upon a conveyor.

The present invention particularly is useful in establishments wherein containers are filled with a product, capped or sealed, and then transferred for subsequent operations such as labeling. The products may range widely in nature such as paint, food stuffs, household preparations, cosmetic and pharmaceutical products, and beverages of various kinds. Such recitation of specific products is merely intended to be illustrative rather than restrictive.

In establishments handling products which must be placed within containers and sealed, as well as to be labeled or having other subsequent operations performed upon the containers, it is frequently found that the filling and capping operation takes place in a certain locality in a plant, such operation not always being continuous. It may also be that the labeling operation is not so extensive that it requires the attention of a full time of a crew of operators. Hence, it is found convenient under such circumstances to fill and cap containers, transfer the same to storage facilities, and subsequently remove the filled and capped containers from storage to feed the same to a labeling machine.

To use a single conveyor between the labeling and capping station, and the labeling station, and have said conveyor provide a substantial storage space would in many circumstances require an extremely long conveyor. Further, under such circumstances, where the feed of filled and capped containers to such conveyor was periodic, each time the conveyor was moved, a tremendous amount of inertia would have to be overcome to start the movement of a partially or fully loaded conveyor of this type. Such a long conveyor would also consume a very long space or, in the event it were arranged circuitously, a considerable number of transfer mechanisms would have to be used, all requiring power to operate the same. Furthermore, feeding containers from such very long storage conveyors would require the movement of a very large number of containers to the labeling machine for example, consuming a great amount of power.

In more recent times, some use has been made of storage conveyors which are relatively wide so as to accommodate a number of transverse rows of containers wherein each row comprised a substantial number of such containers. The containers are fed onto such storage conveyors from a feeding conveyor leading, for example, from a filling and capping machine. The feeding conveyor usually moves the containers in close single file relative to each other, and sections of rows of such containers are pushed sequentially from the feeding conveyor onto the storage conveyor. However, when the leading section of a continuous row of such containers is being transferred onto the storage conveyor, the movement of the next leading section on the feeding conveyor to transfer position requires a short time and meanwhile the storage conveyor is moving transversely away from the feeding conveyor, thereby creating a substantial space between adjacent rows of containers upon the storage conveyor. Thus, there is an extensive amount of such waste space upon such storage conveyor. Such spacing between the rows is desirable in order to feed the rows of containers from the opposite end of the storage conveyor onto a discharge conveyor which receives, in succession, the partial rows of containers from the storage conveyor so as to feed the filled and capped containers for example in close single file to a labeling machine or other apparatus for a subsequent operation.

It is the principal object of the present invention to provide a conveyor system wherein containers may be fed from a feed conveyor which carries containers in close single file, for example, from preceding operations such as a filling and capping machine, to the feed end of a storage conveyor to which regular sections or relatively short rows of even lengths of said close single file of containers are transferred in rows, there being speed changing means coacting with the storage conveyor so as to close up the spaces between adjacent short rows of containers upon the storage conveyor, whereby there is substantially no waste space upon the storage conveyor. Further, at the discharge end of the storage conveyor, there also are suitable speed changing means which coact with the storage conveyor to space the compact successive short rows of containers upon the storage conveyor immediately prior to the same being discharged onto a removing or withdrawing conveyor which receives the containers arranged in continuous close single file, for example, so as to convey the same to a capping machine or any other device for a subsequent operation.

As an adjunct to the above described object of the invention, a plurality of similar storage conveyors may be mounted in close side-by-side relationship, all of the same extending between the feed conveyor and removing conveyor and preferably substantially at right angles thereto, whereby a very compact area of such storage conveyors may be substantially completely filled with containers which are at least temporarily being stored while awaiting removal to another machine for a subsequent operation or otherwise. If desired, the storage conveyors may be mounted substantially within a common substantially horizontal plane or they may be superimposed above each other and end sections thereof may be mounted for vertical movement so as to be brought into alignment with one edge of the feeding or removal conveyors when one of the storage conveyors is to receive containers or have the same removed therefrom.

Another object of the invention is to provide such a conveyor system with automatically operable actuating means which, if desired, may be controlled from a central control station remotely positioned from the conveyors and operating mechanism.

A further object of the invention is to provide a conveyor system, including a substantial storage area on storage conveyors, whereby a single crew of operators, if desired, can alternately be utilized to operate a filling and capping machine for example, sequentially with operating a labeling machine, whereby when the crew of operators is operating the filling and capping machine, the filled and capped containers may be stored in substantial quantity, following which the same crew may operate the capping machine and withdraw the filled and capped containers from the storage conveyors. One of the principal advantages of this arrangement comprises the fact that the storage conveyors may each comprise only a relatively small portion of the total storage area and, while one of said conveyors is either being filled or emptied, the other storage conveyors are idle, thereby not consuming power and necessitating the use of only a very limited amount of power to operate the single storage conveyor and either the feeding conveyor or removing conveyor, depending upon whether the storage conveyor is being filled or emptied.

Still another object of the invention comprises the use of roller-type conveyors in which the rollers preferably are of relatively small diameter and are freely rotatable about the axes thereof extending between a pair of endless link-type chains for example, the chains being longitudinally movable in suitable guideways. Such conveyors are used as storage conveyors in the systems described above. A roller-type conveyor of this type is well adapted for use with speed changing means comprising part of the present invention, whereby at certain portions of the path of movement of the storage conveyors the rollers are not rotated, while at other portions of the path, the rollers may be rotated, selectively as desired, in rotary directions to provide greater speeds than that of the conveyor chains, lesser speeds than said chains, or also to provide reverse movement of containers upon the upper surface of the conveyor rolls relative to the direction in which the chains are moving. Such arrangement also lends itself very efficiently in the function of unscrambling containers, such as where a relatively wide mass of containers is being fed in a direction longitudinally upon the conveyor and it is desired to neck or funnel the mass down into a single close order file for example.

Ancillary to the last mentioned object, a further object is to form each roller of such storage and unscrambling conveyor with a plurality of individual, relatively rotatable sections upon a single shaft extending through all sections of each roller, whereby the various sections of rollers cooperate with the other parallel adjacent roller sections of the conveyor so that the conveyor comprises a plurality of conveyor sections extending longitudinally of the conveyor in side-by-side relationship. In such a construction, speed changing mechanisms may be provided beneath each section of such storage and unscrambling conveyor and be regulated or adjusted in such manner that different surface speeds are present in the several parallel sections of the conveyor or successive portions of each section, thereby producing a curling operation upon the containers to aid in jostling and moving the same into a close single file, especially when using auxiliary angular guide means such as bars, belts or the like.

Details of the foregoing objects and of the invention, as well as other objects thereof, are set forth in the following specification and illustrated in the accompanying drawings comprising a part thereof.

In the drawings:

Fig. 2 is a side elevation of the conveyor system illustrated in Fig. 1 as viewed from one side of one of the storage conveyors of said system.

Fig. 3 is a vertical sectional elevation of one of the storage conveyors as seen on the line 3—3 of Fig. 2, this figure being on a substantially larger scale than Figs. 1 and 2.

Fig. 4 is a fragmentary side elevation of the right-hand end portion of the storage conveyor shown in Fig. 2, this figure being on the same scale as Fig. 3.

Fig. 5 is a fragmentary plan view of the exit portion of a storage conveyor of the type shown in Figs. 1 through 4 and wherein the storage conveyor is adopted for use as an unscrambling conveyor or table, the same embodying the principles of the invention to effect operation thereof.

Fig. 6 is a fragmentary vertical side elevation of a portion of the conveyor or table shown in Fig. 5.

Fig. 7 is another fragmentary side elevation of the storage conveyor and removing conveyor illustrated in Fig. 5.

Fig. 8 is a vertical section of one embodiment of a roller of the storage conveyor shown in Figs. 1 through 4.

Fig. 9 is a vertical sectional view of another embodiment of storage roller comprising a composite roller such as shown in the conveyor or table illustrated in Figs. 5 through 7.

Figure 1:
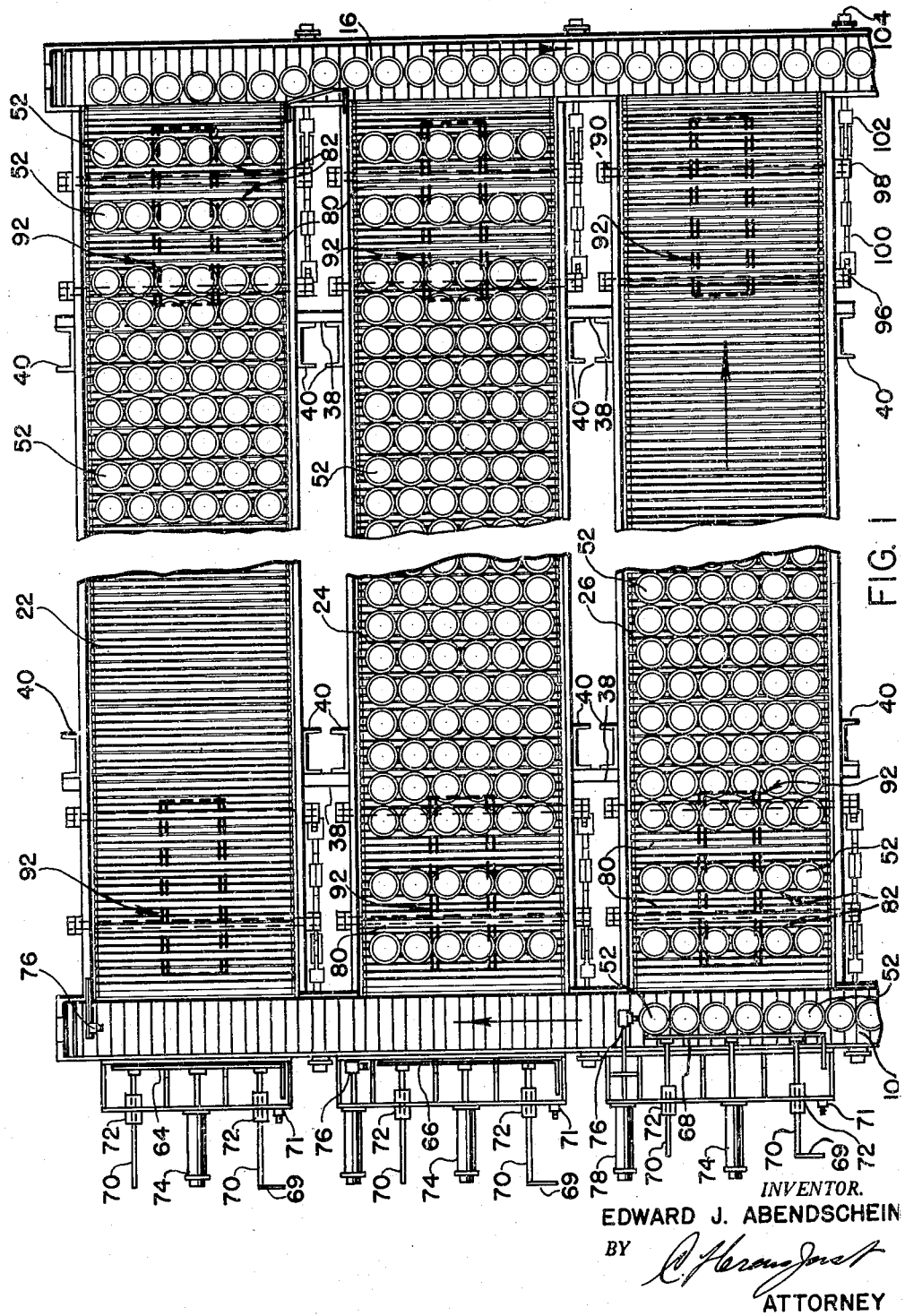
Fig. 1 is an exemplary top plan view, partially broken away to foreshorten the same, illustrating an exemplary arrangement of a plurality of storage conveyors, a feeding conveyor adjacent one end thereof, and a removing conveyor adjacent the other end thereof, the storage conveyors having embodied therewith speed changing mechanisms, all in accordance with the invention.

Referring to Fig. 1, an arrangement of conveyors and various actuating mechanism is illustrated which is intended to be exemplary and not restrictive. In said figure, a feeding conveyor 10 is illustrated, the same being of conventional type as used in canning factories, bottling and filling establishments and the like, and comprising a plurality of flat plates connected by hinge means engaged by sprocket wheels at the ends, the chain being endless and extending around sprocket wheels 12, not shown. Between the sprocket wheels, the conveyor is supported by any suitable means such as channel members 14. Parallel to the feeding conveyor 10 is a removing conveyor 16 which may be similar to the feeding conveyor in construction, the same also being supported by channel members 18 and extending around sprocket wheels 20.

Extending between, and preferably substantially at right angles to the feeding and removing conveyors are a plurality of preferably similar storage conveyors 22, 24 and 26. Referring to Figs. 2 through 4, wherein the storage conveyor 22 is shown as representative of all of the same, it will be seen that each conveyor consists of a pair of endless link chains 28 and 30 which are slidably supported respectively in vertically spaced channels 32 respectively provided on side plates 34 and 36 comprising frames resting upon transverse frame members 38 which are supported by vertical legs 40. Extending between the frame side plates 34 and 36 are shafts 42 to which longitudinally spaced sprocket wheels 44 are affixed.

Extending between the link or sprocket chains 28 and 30 are a series of parallel shafts 46 upon which tubular rollers 48 are rotatably supported by suitable journal bushings 50 such as shown in Fig. 8. The spacing between the shafts 46 is such, relative to the diameters of the rollers 48, that there is preferably only very limited space between the peripheries of adjacent rollers 48, whereby a substantially continuous conveyor surface is provided upon which a wide variety of containers 52 may be supported upon the upper course of the conveyor. It is to be understood that the specific construction of the rollers 48 and the supporting means therefor is exemplary since other types of rollers and supporting means may be utilized within the spirit of the invention. For example, the shafts 46 may be mounted with their ends connected to the links of the endless sprocket chains 28 and 30. However, if desired, the links of the chains may be provided with fixed studs respectively projecting toward each other and in axial alignment, these studs respectively being disposed within the bearing holes of journal bushings 50. It also is to be understood that the specific illustration of containers 52 is only exemplary in that a wide variety of kinds, shapes and sizes of containers may be supported by the storage conveyors 22, 24 and 26, usually only a single kind of container being handled at any one time however.

The exemplary mechanism for driving the conveyors 22, 24 and 26 comprises a pair of driving sprockets 54 supported upon a driven shaft extending from a gear box 56 which preferably affords variable drive. A portion of each of the chains 28 and 30 extends over idler sprockets 58 and around the driving sprockets 54 on said driven shaft. The shaft may be supported by any suitable bearings or brackets, not shown, in accordance with conventional practice. The drive shaft for the gear box 56 is operated by a suitable electric motor 60 which is connected to the gear box by any suitable means such as a chain or belt 62.

The inner edges of the feeding conveyor 10 and removing conveyor 16 are as close as possible to the ends of the conveyors 22, 24 and 26 so as to facilitate the transfer of containers from the feeding conveyor 10 onto the storage conveyors, and from the storage conveyors onto the removing conveyors 16. To effect removal of the containers 52 from the feeding conveyor 10, attention is directed to Fig. 1 wherein it will be seen that a plurality of push bars 64, 66 and 68, parallel to the axis of conveyor 10, are mounted for movement transverse to the axis of conveyor 10 by suitable exemplary guide bars 70 supported by fixed bearings 72. Automatic actuation of the push bars 68, 70 and 72 may be effected preferably by automatic means comprising exemplary fluid-operated cylinder units 74, the actuation of which may be effected from a remote control station, not shown, but of conventional type commonly used in industry.

Assuming the feeding conveyor 10 to be moving in the direction of the arrow shown thereon in Fig. 1, automatic control of the storage conveyors may be effected by exemplary means such as a limit switch 76 which may automatically be projected into the position shown relative to storage conveyor 26 by any suitable means such as a cylinder unit 78, preferably controlled from a remote station. When the leading container 52 engages the limit switch 76 as shown in the lower left-hand corner of Fig. 1, movement of the storage conveyor 26 away from feeding conveyor 10 will take place. It will be understood that the conveyor 10 preferably moves continuously and may be feeding containers from a filling and capping stationed positioned, for example, close to the first storage conveyor. The movement of the storage conveyor away from feeding conveyor 10 is relatively slow and occurs only while the push bar 68 is moving a row of containers of predetermined length, as long as the push bar, for example, onto the storage conveyor 26. A gate on the trailing end of the push bar prevents forward movement of containers by feeding conveyor 10 and although the feeding conveyor 10 continues to move forwardly the flat nature thereof will permit it to slide under the row of containers thereon halted momentarily by the gate. The cylinder unit 76 operates the push bar 68 opposite the feed end of storage conveyor 26 to transfer the partial row of containers 52 onto the storage conveyor 26. Movement of the push bar is stopped by appropriate means such as a limit switch 71 actuated by an arm 69 carried by one of the guide bars 70.

It is understood that the storage conveyor 26 is being moved in the direction of the arrow shown thereon by the power means therefor as controlled by limit switch 76, this conveyor being in the process of being filled at this time. At the same time, it will be assumed that storage conveyor 24 has been completely filled to the extent permitted in accordance with the invention, while the storage conveyor 22 is being emptied onto the removing conveyor 16. During the filling of the storage conveyors the movement thereof is intermittent, as controlled by the limit switches 76 in the circuit of the power means therefor. Such movement of the chains of the storage conveyors preferably is slow. The fact that the rollers 48 are freely revolvable relative to the chains 28 and 30 permits speed-up of movement of containers from feeding conveyor 10 onto the storage conveyors to take place, by means to be described, not only to move a row being transferred from the feeding conveyor away from the feeding conveyor to make room for the next row to be transferred, but also to compact the containers upon the storage conveyors. Such arrangement provides for a desired mobility and cushioning of the containers as rows thereof are moved into compact relationship to the containers previously moved onto the storage conveyor, preferably into a substantially compact mass.

In accordance with the present invention, the spaces 80 will occur only at the feed and discharge end portions of the storage conveyors. The closing of such spaces at the feed end of the storage conveyors is effected by the use of one of several embodiments of speed changing means provided in the present invention. Referring particularly to Figs. 2 through 4, one embodiment of such speed changing mechanism comprises a plate 84 which preferably actually comprises a channel, the depending flanges 86 of which have notches 88 which receive transverse support shafts 90. Fixed to the upper surface of plate 84 is a preferably frictional mat 92, formed from durable sheet rubber stock or the like, said plate being frictionally engageable with the lower surfaces of the rollers 48 in the upper course of the storage conveyor 22. Inasmuch as the upper course of the conveyor 22 is moving in the direction of the arrow shown in Fig. 4, it will be seen that the engagement of the lower surface of each of the rollers with the frictional mat 92 will increase the speed of the upper surfaces of said rollers to twice that of the chains 28 and 30, in accordance with well known mechanical principles.

The length of the frictional mat 92 is selected so that it will effect sufficient double speed of the upper surfaces of the rollers 48 at the feed end and of the storage conveyor so that only several spaces 80, shown in Fig. 1, will exist between two or three rows 82 of the containers before said spaces are closed and the storage container otherwise will support a substantially solid mass of containers comprising closely arranged rows thereof as shown in the central portions of the storage conveyors in Fig. 1. It is to be understood that while the rows 82 are illustrated as being straight, this only is exemplary and it is not essential that they be straight.

Under certain conditions, it may be desirable to render the storage conveyor free of the effect of the speed-up mechanism and, under such circumstances, this can be done by mounting the channel member 84 with its frictional mat 92 so as to be vertically movable, preferably at will, from a remote station for example, or manually. Suitable vertically movable means are illustrated in Figs. 2 through 4, these being of exemplary nature and comprising pairs of levers 94 which are fixed to each of a pair of shafts 90 so as to be movable therewith when said shafts are rotated. Rotation of the shafts is effected by crank arms 96 and 98, the latter being longer as shown in Fig. 4. The crank arms 96 and 98 are connected by an adjustable link member 100 which will cause simultaneous operation of the crank arms 96 and 98, as well as the levers 94, thereby elevating the frictional mat 92 into parallel and frictional engagement with the undersurfaces of the rollers 48 when the crank arm 98 is actuated by any suitable means such as link 102 connected to suitable operating means such as fluid operated cylinder 104. Downward vertical movement of the frictional mat 92 will cause the mat to be rendered inoperative when desired.

When a substantially solidly loaded storage conveyor is to be discharged onto the removing conveyor 16 as shown in relation to storage conveyor 22 in Fig. 1 the storage conveyors 22, 24 and 26 are driven at a constant speed. However, it is necessary to again space the rows 82 of the containers 52 at the discharge ends of the storage conveyors in order that the removing conveyor 16 may carry away the last deposited row of containers before the next row arrives for removal to conveyor 16. Accordingly, as shown in Fig. 2, speed changing means 106 are provided adjacent the exit or discharge end of the storage conveyor 22. It will be understood that similar speed changing means 106 will be included with the other storage conveyors 24 and 26, as shown in Fig. 1 somewhat diagrammatically by dotted lines. Speed changing means 106 is similar to that shown in Figs. 3 and 4, the same being operated preferably by a fluid actuated cylinder unit 108, controlled if desired from a remote location as a composite control station for the entire system. Further, while the rows 82 of the containers are shown to be straight during removal, said rows need not be straight.

Even greater flexibility for controlling the speed of the storage conveyors at the feed and discharge ends thereof is afforded by the use of belt means for speed changing mechanism, such as shown in Fig. 6, in lieu of a frictional mat 92 and its supporting means. An exemplary arrangement is shown in said figures for mounting and driving a speed changing belt 110 which is endless and is mounted around a pair of rotatable rolls 112. The rolls may be supported upon suitable shafts extending between bearings provided in side frame members 114 comprising part of an auxiliary frame 116 supported between the upper and lower courses of one of the storage conveyors such as conveyor 22 specifically illustrated in Fig. 6. The belt 110 may be much narrower than conveyor 10. Supported in any suitable manner by auxiliary frame 116 or otherwise, as dictated by space requirements, is a variable speed gear box 118, driven by an appropriate power means such as an electric motor 120. The switch for the motor 120 may be located at a central control station, the operation of the switch being automatic, if desired, in accordance with a predetermined cycle. Suitable space may be provided between the upper and lower courses of the storage conveyor to accommodate the auxiliary frame 116 and its speed changing belt 110.

It also will be understood that the belt 110 preferably may be formed to have at least an outer frictional surface of rubber or the like, whereby the upper course thereof will be frictionally engageable with the undersurfaces of the rollers of the storage conveyor. Depending upon the speed of the belt 110 and also the direction of movement thereof, the speed of the rollers of the storage conveyor and the direction of movement of the upper surfaces thereof may be varied within very wide limits. If desired, the motor 120 also may be of the reversible direction type, thereby lending even greater versatility to the drive afforded by the belt 110. Under such circumstances, the upper surfaces of the rollers of the storage conveyor may be moved at practically any desired speed within reasonable limits in feeding direction, either from the feeding conveyor 10 or toward the removing conveyor 16, as readily can be visualized by inspection of Fig. 6.

From the foregoing, and particularly with reference to Fig. 1, it will be seen that the system described above affords wide latitude for storing containers which are fed from certain apparatus in an industrial plant or the like, such as a filling and capping machine, so that substantially an infinite quantity of containers may be stored in side-by-side relationship upon a plurality of similar storage conveyors, or in superimposed arrangement of such storage conveyors, as well as sets of such superimposed storage conveyors being arranged in side-by-side relationship with other superimposed sets thereof. The feeding of containers onto the storage conveyors as well as the removal thereof from the discharge ends of said storage conveyors onto a removing conveyor may be achieved automatically in accordance with a master timing switch of the program type, for example, all of the same being mounted on a central control board readily accessible to an overseer who preferably has a view of the entire storage area. For example, while the storage conveyors are being loaded sequentially, others which have previously been loaded will remain idle, while still others successively may be unloaded onto a removing conveyor so as to carry the containers, preferably in close single file formation, to another operating station in the establishment such as a labeling machine.

Such an arrangement also ably lends itself to being used in establishments where certain limited quantities of contents, less than will fill the containers, are first discharged into containers where they remain, for example until, additional ingredients are added at another station, and even further additions of other ingredients may take place at still further stations, the storage of the containers which have been partially filled meanwhile being afforded by the storage conveyors of the system. As a result, a very wide latitude of movement of containers, with intermittent storage, is afforded by the present system.

The construction of the conveyor system described above also lends itself capably to being used for unscrambling functions such as where a relatively wide mass of containers is stored upon a conveyor similar, for example, to one of the storage conveyors 22, 24 or 26, and it is desired to discharge the same onto a removing conveyor movable in the same direction as the storage conveyor but upon which removing conveyor it is desired that only a close single file arrangement of the containers shall be moved. Such arrangement also is useful where filled and capped containers for example are dumped so as to stand vertically upon such a storage conveyor from cases, boxes, and the like, and it is desired to arrange the same into a close single file relationship for feeding the containers to a labeling machine for example, or otherwise. A highly useful arrangement for accomplishing this is illustrated in Fig. 5, the arrangement shown therein largely embodying the principles of the invention described hereinabove relative to Figs. 1 through 4.

Referring to Fig. 5, a single conveyor 22', similar to storage conveyor 22 of Fig. 1, is loaded with closely grouped or bunched containers 52. For purposes of specific illustration, it is assumed that the conveyor 22' will comprise closely arranged rollers of a diameter similar to rollers 48 for example. However, preferably, the rollers 122 of the conveyor shown in Fig. 5 are composite and are similar to the exemplary illustration shown in Fig. 9. These rollers comprise a shaft 124 which extends between and are supported by chains 126 which are fragmentarily illustrated in Fig. 7. These chains pass around pairs of sprocket wheels 128 shown in Figs. 5 and 7, the same being fixed to opposite ends of shaft 130 arranged at opposite ends of the frame which supports the storage or unscrambling conveyor 22'.

From Fig. 9, it will be seen that the composite rollers 22' respectively comprise preferably tubular sections 132 of even length, said sections each being supported by bushings 134 rotatably mounted upon shaft 124. The sections 132 of each composite roll are independently movable relative to each other, whereby added versatility is afforded the storage or unscrambling conveyor 22' shown in Fig. 5, as will now be described.

The conveyor 22 in Fig. 5 may be of any desired length and endless, extending around sprocket wheels, and the discharge end thereof, shown in plan view in Fig. 5, is the important portion thereof in that it is the portion wherein the containers 52 are necked or funnelled down by more or less orderly jostling or curling of the individual containers by the conveyor sections 132, as well as by the engagement of one container with another. In the curling of the containers, they are moved rotatably about the vertical axes thereof and such curling is desirable in order to prevent a locked jam of the containers at the discharge end 136 of conveyor 22' as shown in Fig. 5.

To implement the funnelling or necking of the container arrangement in the formation illustrated in Fig. 5 in plan view, a pair of overhead, horizontal frame members 138 for example, are supported by vertical members 140 at opposite sides of the main conveyor frame. The members 138 support angularly arrangeable guide members 142 and 144 which are adjustable thereon by any suitable means such as longitudinal slots 146 through which clamping bolts 148 project.

As shown in Fig. 5, the guide members 142 and 144 are preferably disposed at different angles relative to the central conveyor section comprising the intermediate roller sections 132. However, if it is desired, the guide members 142 and 144 may be arranged so as to divert the containers 52 as otherwise desired, such as toward one of the side conveyor sections. The discharge end portions of the guide members 142 and 144 preferably connect with a pair of parallel guide members 150 and 152 which are spaced apart adequately to accommodate, for example, a single row of containers 52 moving therethrough as shown at the right-hand end of Fig. 5. The guide members 150 and 152 are disposed above a discharge conveyor 154, this being similar, if desired, to feeding conveyor 10 or removing conveyor 16. The discharge conveyor 154 is of the endless type and passes around supporting sprockets 156 at opposite ends of the conveyor, the same being mounted upon shafts 158, one having a drive gear or sprocket 160, see Fig. 5, fixed to one end of said shaft and connected to a suitable source of power such as a variable drive gear box, not shown.

The conveyor 154 may be supported between the sprockets 156 by guide channels or members 162 in accordance with conventional practice. Also, the entrance end of conveyor 154 is adjacent the exit end of unscrambling table or conveyor 22' as shown in Fig. 7. Due to the curvature of sprockets 128 and 156, a space will occur between the upper courses of the conveyors respectively supported by said sprockets, where it is necessary to provide a short bridging means such as plate 164 therebetween. The discharging force of the containers passing from the discharge end 136 of conveyor 22' will be sufficient to slidably move the containers across bridging plate 164 onto discharge conveyor 154.

To insure the positive rearrangement of the containers from the relatively wide mass thereof, as shown in the left-hand end of Fig. 5, to the close single file arrangement shown at the right-hand end of said figure, a plurality of speed changing means preferably are arranged beneath the various sections of the conveyor comprising parallel roller sections 132 mounted on successive shafts 124, said sections of the conveyor actually comprising a plurality of parallel conveyors arranged closely in side-by-side relationship. Referring to Fig. 5, it will be seen that these speed changing means are illustrated diagrammatically and are indicated by reference letters A through F, shown in heavy dotted lines. The positions of these speed changing units as shown in Fig. 5 is only exemplary and said positions may be varied as desired to suit certain operating conditions. The speed changing means may be of the type, for example, shown in Figs. 3 and 4, or of the type shown in Fig. 6. That is, they either may be the friction plate type or the friction belt type. Preferably, an assortment of such speed changing means is provided in order to insure desired, positive funnelling or necking of the containers into the space between the guide members 142 and 144 so that only a single row of such containers preferably passes on to the discharge conveyor 154 and no jamming occurs.

By way of specific example, which is not intended to be restrictive, speed changing means A may be the plate type, means B the belt type, means C the plate type, means D the belt type, means E the plate type, and means F the belt type. Preferably also, the speed changing means are of the type which may be vertically moved into engagement with or removed from engagement with the undersurfaces of the roller sections 132. Under circumstances where the belt type speed changing means are used, the drive may be reversible and arranged so that the upper surfaces of the roller sections 132 move in reverse direction to the forward movement of conveyor 22' toward the discharge end 136 of said conveyor. In most circumstances, it is preferred that the adjacent sections of the conveyor in the areas respectively driven by the various speed changing means be moved at different relative speeds on the upper surfaces thereof, whereby when the containers straddle two of said sections at one time, definite curling or rotation of the same about their vertical axes is assured, thereby affording maximum orderly jostling and movement of the containers into a close single file relationship as shown in Fig. 5.

Under the circumstances described above relative to Fig. 5, it will be seen that a rather wide range of jostling movements is afforded by the composite conveyor, particularly near the discharge end thereof, different longitudinally related portions of each conveyor section even having different speeds or different directions if desired in order to enhance the funnelling or necking movement of the wide mass of containers into close single file relationship. Due to the fact that there is substantial space between the upper and lower courses of the composite conveyor sections, there is ample room to introduce the supporting and drive means for the speed changing units which engage only the undersurfaces of the upper courses of the conveyor sections. Supporting shafts or bars may extend entirely through the composite conveyor between the upper and lower courses thereof and be supported at opposite sides of the frame of the conveyor as a specific arrangement or requirement may dictate, all within the spirit of the invention.

Further, it will be understood that the wide latitude of movement for the discharging end portion of the composite conveyor illustrated in Fig. 5 takes place while the chains which support the shaft 124 move forward constantly at a steady speed. Obviously however, the speed of the composite conveyor at the left-hand end of Fig. 5 will be substantially slower than the speed of the discharge conveyor 154. Specifically, if containers are loaded upon the left-hand end of the composite conveyor in Fig. 5 more or less in six abreast relationship, then the speed of discharge conveyor 154 will be substantially six times that of the composite conveyor at the left-hand end of Fig. 5. Inasmuch as the drive means for the composite conveyor, as well as the drive means for the discharge conveyor 154 are variable, the relative speeds easily may be regulated to insure that no locking jams of the containers occur while the same are moving relative to the guide members 142 and 144, onto discharge conveyor 154, whereupon they are arranged in close single file relationship.

No electric circuit has been illustrated specifically since the circuit contemplated to operate the various electric motor or solenoid power means, limit and other control switches, manual switches, and the like, are, of standard nature, as also are any program switches which are referred to hereinabove.

If desired, either the friction plate or movable friction belt type speed changing means may be moved vertically into operative relationship with the underside of the upper course of as many sections as desired of the storage or unscrambling conveyors, either by manual means, not shown, or the power means illustrated in Figs. 2 through 4 for example. It also will be understood that the belt type speed changing means specifically shown in Fig. 5 may be mounted so as to be vertically movable if desired. However, the wide versatility afforded the driving of the flexible friction belt 110 at a wide range of speeds, in either direction, largely obviates the need for moving the auxiliary frame 116 vertically so as to engage or disengage the friction belt 110 with the undersurfaces of the storage conveyor rollers to effect different speeds and directions of the upper surface of the rollers of conveyor 22.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A conveyor system for feeding containers to a storage area and removing the same in orderly arrangement therefrom, said system comprising in combination, a plurality of endless roller type storage conveyor means supported in substantially parallel relationship and movable longitudinally along predetermined paths, said conveyor means comprising parallel chain means having rollers extending therebetween and freely rotatable relative to each other and said chains, means to feed groups of containers selectively onto one end of each of said conveyor means, means to move said storage conveyor means in a direction to move said containers away from said feeding means, a removing conveyor at the other end of said storage conveyor means operable to receive containers arranged in a row from said storage conveyor means, and means positioned beneath each storage conveyor means at longitudinally spaced positions and adjacent opposite ends thereof and engageable with the lower surfaces of said rollers thereof to increase the top surface speed of said rollers at the opposite ends of said storage conveyor means relative to the speed of the intermediate portion of said storage conveyor means.

2. A conveyor system for feeding containers to a storage area and removing the same in orderly arrangement therefrom, said system comprising in combination, a plurality of roller type storage conveyors supported in substantially parallel relationship for movement longitudinally along predetermined paths, said conveyors comprising pairs of parallel chains and rollers extending therebetween and supported for independent rotation relative to said chains and each other, means to feed groups of containers selectively onto one end of each of said conveyors comprising the feed end, means to drive said feed means, means to move said storage conveyor chains in a direction to move said containers away from said feeding means, a removing conveyor at the other end of said storage conveyors operable to receive containers arranged in a row from said storage conveyors, and means positioned beneath each storage conveyor adjacent opposite ends thereof and engageable with the lower surfaces of said rollers of said conveyors to vary the top surface speed of said rollers relative to said chains, the speed varying means adjacent the feed end of said storage conveyors serving to compact the containers thereupon and the speed varying means at the other end of said storage conveyors serving to space transverse rows of said containers for successive discharge of said transverse rows onto said removing conveyor upon which said rows of containers will comprise a substantially continuous single row of containers.

3. The conveyor system according to claim 2 further including means operable selectively to move said speed varying means into contact with and away from the lower surfaces of said rollers of said storage conveyors.

4. The conveyor system according to claim 2 further characterized by said feed means comprising a conveyor movable substantially transversely to the feed ends of said storage conveyors and said removing conveyor also being substantially transverse to the other ends of said storage conveyors, said system also including pusher bar means positioned along said feed conveyor opposite the feed ends of said storage conveyors and operable to transfer partial rows of containers successively from said feed conveyor onto said storage conveyors in spaced relationship to each other, and said system further including means operable to stop said feed means for said feed conveyor during the transfer of said partial rows of containers therefrom to said storage conveyors.

5. The conveyor system set forth in claim 4 further including a limit switch mounted for projection into the path of containers being fed by said feed conveyor and operable when engaged by the leading container upon said feed means to start the power means moving the storage conveyor in feeding direction.

6. The conveyor system set forth in claim 4 further including fluid operated cylinder units connected to a source of fluid pressure controlled by a circuit including other limit switches, said pusher bars being connected to and actuated by said cylinder units, and means carried by said pusher bars and engageable with said other limit switches at the end of the feeding movements of said pusher bars to stop the feeding movement thereof, whereupon said pusher bars are returned to starting position before the feeding movement of the feeding conveyor is resumed.

7. The conveyor system set forth in claim 1 further characterized by said speed varying means comprising endless belt units respectively supported adjacent opposite ends of each storage conveyor means; each unit comprising a pair of spaced rotatable members to support said belt for movement, and variable speed and reversible drive means connected to one of said rotatable members to actuate the same and said belt; one course of said belt of each unit engaging the lower surfaces of the rollers of said storage conveyor means adjacent the feed and discharge ends thereof for a limited portion of the length thereof to effect a speed in the upper surfaces of said rollers greater than the speed of the chains of said conveyor means.

8. The conveyor system set forth in claim 1 further characterized by said speed varying means comprising a plurality of plate means each having a friction face thereon and respectively positioned adjacent the feed and discharge ends of said storage conveyor means beneath the upper courses thereof with the friction faces thereof uppermost, and means supporting said plate means for engagement of the friction faces thereof with the lower surfaces of the rollers of the upper courses of said storage conveyor means, whereby an increase in speed in the upper surfaces of said rollers over the speed of the chains is effected when said plate means is elevated into frictional engagement with the lower surfaces of said rollers.

9. A conveyor system for feeding containers to a storage area and removing the same in a predetermined close file order therefrom and comprising in combination, a composite roller type storage and unscrambling conveyor comprising roller sections disposed in end-to-end relationship and rotatably supported upon shafts extending between a pair of endless chains respectively at opposite edges of said conveyor and movable longitudinally, whereby the roller sections adjacent each other in the direction of movement of said chains comprise individual conveyors in side-by-side relationship, means to move a mass of containers onto one end of said composite conveyor and extending thereacross, means operable to move said composite conveyor at a predetermined speed in one direction toward one end of the path of movement of the upper course thereof, a removing conveyor at said one end of said composite conveyor operable to receive containers arranged in a close single file row from said composite conveyor, and speed changing means positioned beneath predetermined areas of the various roller sections of the upper course of said composite conveyor at longitudinally spaced positions and engageable respectively with the lower surfaces of said roller sections moving over said areas to vary the top surface speed of said roller sections relative to said chains, whereby different top surface speeds are produced by said various roller sections moving over said areas to produce rotating movement of certain of said containers about the vertical axes thereof while supported by said roller sections moving over said areas so as to facilitate changing the arrangement of said containers into a close single file row of containers.

10. The conveyor system set forth in claim 9 further characterized by said speed changing means positioned beneath certain of said predetermined areas of conveyor sections comprising endless belts having friction surfaces engageable with the lower surfaces of rollers of sections of said conveyor passing thereover, thereby producing different upper surface speeds on said rollers than the speed of other sections of said conveyor.

11. The conveyor system set forth in claim 9 further characterized by said speed changing means positioned beneath certain of said predetermined areas of conveyor sections comprising substantially flat plate members having frictional upper surfaces and mounted for engagement of said frictional surfaces with the lower surfaces of rollers of sections of said conveyors passing thereover, thereby producing different upper surface speeds on said rollers than the upper surface speeds of other sections of said conveyor.

12. The conveyor system set forth in claim 10 further characterized by still other predetermined areas of sections of said conveyor having speed changing means positioned beneath the upper courses thereof which comprise substantially flat plate members having frictional upper surfaces and mounted for engagement of said frictional surfaces with the lower surfaces of the roller sections moving thereover, thereby producing upper surface speeds on said roller sections different from the upper surface speeds produced on roller sections moving over said belt-type speed changing means.

13. The conveyor system set forth in claim 9 further including guide means extending angularly across the upper surface of the upper course of said storage and unscrambling conveyor from one edge toward the other, said guide means being engageable by containers being moved by said conveyor to move the same transversely upon said conveyor, the discharge conveyor also being mounted to move substantially in the same general direction as the chains of said storage and unscrambling conveyor.

14. The conveyor system set forth in claim 9 further characterized by said speed changing means beneath different sections of said storage and unscrambling conveyor being operable differently to produce different surface speeds in the rollers of transversely adjacent sections, thereby producing curling movement of said containers when straddling two adjacent sections of said conveyor, and means to drive said speed changing means differently.

15. The conveyor system set forth in claim 14 further including guide means extending angularly across the upper surface of the upper course of said storage and unscrambling conveyor from one edge toward the other, said guide means being engageable by containers being moved by said conveyor to move the same transversely upon said conveyor.

16. The conveyor system set forth in claim 9 further characterized by a plurality of said speed changing means being mounted beneath at least one of the conveyor sections at locations spaced longitudinally of said sections, and including means to operate said speed changing means differently, whereby the rollers in areas arranged longitudinally of said conveyor sections will have different top surface speeds from each other and other areas of said conveyor section.

17. The conveyor system set forth in claim 16 further including guide means extending angularly across the upper surface of the upper course of said storage and unscrambling conveyor from one edge toward the other, said guide means being engageable by containers being moved by said conveyor to move the same transversely upon said conveyor.

References Cited in the file of this patent

UNITED STATES PATENTS

| | | |
|---|---|---|
| 733,804 | Blaisdell | July 14, 1903 |
| 1,117,433 | Owens | Nov. 17, 1914 |
| 2,071,859 | Steiner | Feb. 23, 1937 |
| 2,629,481 | Stover | Feb. 24, 1953 |
| 2,642,173 | Wehmiller | June 16, 1953 |
| 2,678,124 | Bergmann | May 11, 1954 |
| 2,753,975 | Day | July 10, 1956 |